United States Patent
Honjo et al.

(10) Patent No.: US 10,030,595 B2
(45) Date of Patent: Jul. 24, 2018

(54) MULTIPURPOSE VEHICLE

(71) Applicant: Kubota Corporation, Osaka-shi (JP)

(72) Inventors: Noriyasu Honjo, Sakai (JP); Tatsuya Tsuji, Tokyo (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/354,094

(22) Filed: Nov. 17, 2016

(65) Prior Publication Data

US 2017/0254280 A1 Sep. 7, 2017

(30) Foreign Application Priority Data

Mar. 3, 2016 (JP) .................................. 2016-041387

(51) Int. Cl.
| | |
|---|---|
| F02D 41/02 | (2006.01) |
| F16H 61/12 | (2010.01) |
| B60K 17/02 | (2006.01) |
| B60K 17/06 | (2006.01) |
| B60K 17/16 | (2006.01) |
| B60K 17/34 | (2006.01) |
| B60K 20/02 | (2006.01) |
| F02D 41/30 | (2006.01) |
| F16H 63/50 | (2006.01) |

(52) U.S. Cl.
CPC ............ *F02D 41/022* (2013.01); *B60K 17/02* (2013.01); *B60K 17/06* (2013.01); *B60K 17/165* (2013.01); *B60K 17/34* (2013.01); *B60K 20/02* (2013.01); *F02D 41/3005* (2013.01); *F16H 61/12* (2013.01); *F16H 63/50* (2013.01); *F16H 2061/128* (2013.01); *F16H 2061/1276* (2013.01); *F16H 2063/508* (2013.01)

(58) Field of Classification Search
None
See application file for complete search history.

(56) References Cited

U.S. PATENT DOCUMENTS

| | | | | |
|---|---|---|---|---|
| 4,965,730 A | * | 10/1990 | Kurihara ............... | B60W 10/06 477/78 |
| 5,908,460 A | * | 6/1999 | Amisano ............... | F16D 48/068 701/34.3 |
| 2007/0213164 A1 | * | 9/2007 | Tasaka .................... | F16H 61/12 475/119 |
| 2008/0188348 A1 | * | 8/2008 | Kumazaki .............. | B60K 6/365 477/35 |
| 2012/0055728 A1 | | 3/2012 | Bessho et al. | |

(Continued)

FOREIGN PATENT DOCUMENTS

JP 201251507 A 3/2012

*Primary Examiner* — Justin Holmes
(74) *Attorney, Agent, or Firm* — The Webb Law Firm

(57) ABSTRACT

A multipurpose vehicle includes an engine, a fuel supply unit that supplies fuel to the engine, a gear transmission device that changes speed of power from the engine through a shifting operation, a coupling state detection sensor that detects a coupling state of the gear transmission device, a determination unit that determines whether the coupling state is an incomplete coupling state based on a detection signal from the coupling state detection sensor, and a fuel supply control unit that executes a fuel cut to reduce a fuel supply amount of the fuel from the fuel supply unit to the engine to a value less than a reference value, if the determination unit determines that the coupling state is the incomplete coupling state.

4 Claims, 6 Drawing Sheets

(56) References Cited

U.S. PATENT DOCUMENTS

| | | | | |
|---|---|---|---|---|
| 2013/0274062 A1* | 10/2013 | Arai | ............. | F16H 61/12 477/5 |
| 2014/0194246 A1* | 7/2014 | Ueda | ............. | B60K 6/442 477/5 |
| 2014/0256507 A1* | 9/2014 | Sakamoto | ............. | B60W 10/11 477/77 |

\* cited by examiner

MULTIPURPOSE VEHICLE

CROSS-REFERENCE TO RELATED APPLICATION

This application claims priority to Japanese Patent Application No. 2016-041387 filed Mar. 3, 2016, the disclosure of which is hereby incorporated in its entirety by reference.

BACKGROUND OF THE INVENTION

Field of the Invention

The present invention relates to a multipurpose vehicle including a gear transmission device that changes speed of power from an engine through a shifting operation.

Description of Related Art

An example of such a multipurpose vehicle is disclosed in JP 2012-515071A or US 2012/0055728 A1 corresponding thereto. This multipurpose vehicle includes an engine, a belt-type continuously (steplessly) variable transmission device, a gear speed-changing mechanism and a differential mechanism that are disposed on a power transmission path through which power from the engine is transmitted to drive wheels. A steering wheel, an accelerator pedal and a shift lever are disposed in a driver's section. When traveling is to be performed at a low speed, the gear speed-changing mechanism is switched to a low gear using the shift lever. When traveling is to be performed on an ordinary road or the like at a medium or high speed, the gear speed-changing mechanism is switched to a high gear. Adjustment of the vehicle speed is performed using the accelerator pedal.

Since gears of the gear speed-changing mechanism is usually switched using the shift lever while the engine is driving, if the engine speed is increased by depressing the accelerator pedal when coupling of gears responsive to a gear shift operation is incomplete, gear noise occurs.

In view of the above-described circumstances, it is desired to avoid the occurrence of gear noise that is caused by an increase in the engine speed when coupling of gears of a gear transmission device is incomplete.

SUMMARY OF THE INVENTION

A multipurpose vehicle according to the present invention includes an engine, a fuel supply unit that supplies fuel to the engine, a gear transmission device that changes speed of power from the engine through a shifting operation, a coupling state detection sensor that detects a coupling state of the gear transmission device, a determination unit that determines whether the coupling state is an incomplete coupling state based on a detection signal from the coupling state detection sensor, and a fuel supply control unit that executes a fuel cut to reduce a supply amount of the fuel from the fuel supply unit to the engine to a value less than a reference value, if the determination unit determines that the coupling state is the incomplete coupling state. The incomplete coupling state means a not-yet-meshed state in which meshing of gears is insufficient as a result of the shifting operation of the gear transmission device, that is, a state in which the transmission device is not completely in gear.

With this configuration, if the coupling state of power transmission in the gear transmission device is incomplete (if the gears are not reliably engaged and meshing of the gears is incomplete, for example), the fuel cut is executed to reduce the fuel supply from the fuel supply unit to the engine. Whether the gear transmission device is in the incomplete coupling state is determined based on the detection signal of the coupling state detection sensor. The engine speed is forcibly reduced by the fuel cut that is executed depending on the determination result, and even if an accelerator operating tool is operated to a high-speed side, the engine speed does not increase. Consequently, gear noise is suppressed or substantially prevented from occurring.

The amount by which the fuel is to be reduced from the reference amount by the fuel cut can be selected within a range corresponding to values of the engine speed between zero and approximately the idle speed. In order to reliably eliminate the gear noise without stopping the engine, the power transmission path from the engine to the gear transmission device can be blocked by means of a clutch or the like. For this purpose, according to a preferred embodiment of the present invention, a centrifugal clutch is provided on the power transmission path between the engine and the gear transmission device, and an amount of reduction in the fuel by the fuel cut is set such that a number of revolutions of the engine becomes smaller than a clutch-in number of revolutions at which the centrifugal clutch is engaged. With this configuration, if the gear transmission device is in the incomplete coupling state, the fuel cut is performed, and thus, the number of revolutions of the engine becomes smaller than the clutch-in number of revolutions at which the centrifugal clutch is engaged. As a result, the centrifugal clutch is in a blocked state, power from the engine to the gear transmission device is blocked, and gear noise does not occur.

When the shifting operation (speed-changing operation) of the gear transmission device is performed using a man-operated tool such as a shift lever, during speed change, the gear transmission device transitions from a complete coupling state to another complete coupling state via the incomplete coupling state, as a result of an operation by the driver. Therefore, it is important that the driver knows whether the gear transmission device is in the incomplete coupling state or the complete coupling state. For this purpose, according to a preferred embodiment of the present invention, the shifting operation of the gear transmission device is performed as a result of an operation using a man-operated tool, and a notification device that provides a notification that the coupling state is the incomplete coupling state (not-yet-meshed state) is provided.

The multipurpose vehicle travels on bad roads such as sandy areas and rocky areas or on paved roads such as ordinary roads and expressways. Therefore, a gear transmission device that is switched as necessary between a low gear that is mainly suited for travelling on bad roads and the like and a high gear that is mainly suited for traveling on paved roads and the like is suited for the gear transmission device. However, once a gear of the gear transmission device is set, it is desirable that adjustment of the vehicle speed for that gear is achieved through a simple and smooth speed change. For this purpose, according to a preferred embodiment of the present invention, a continuously variable transmission device is provided on the power transmission path between the centrifugal clutch and the gear transmission device.

DETAILED DESCRIPTION OF THE PREFERRED EMBODIMENTS

[Basic Principle of Fuel Cut Control]

Figure 1:
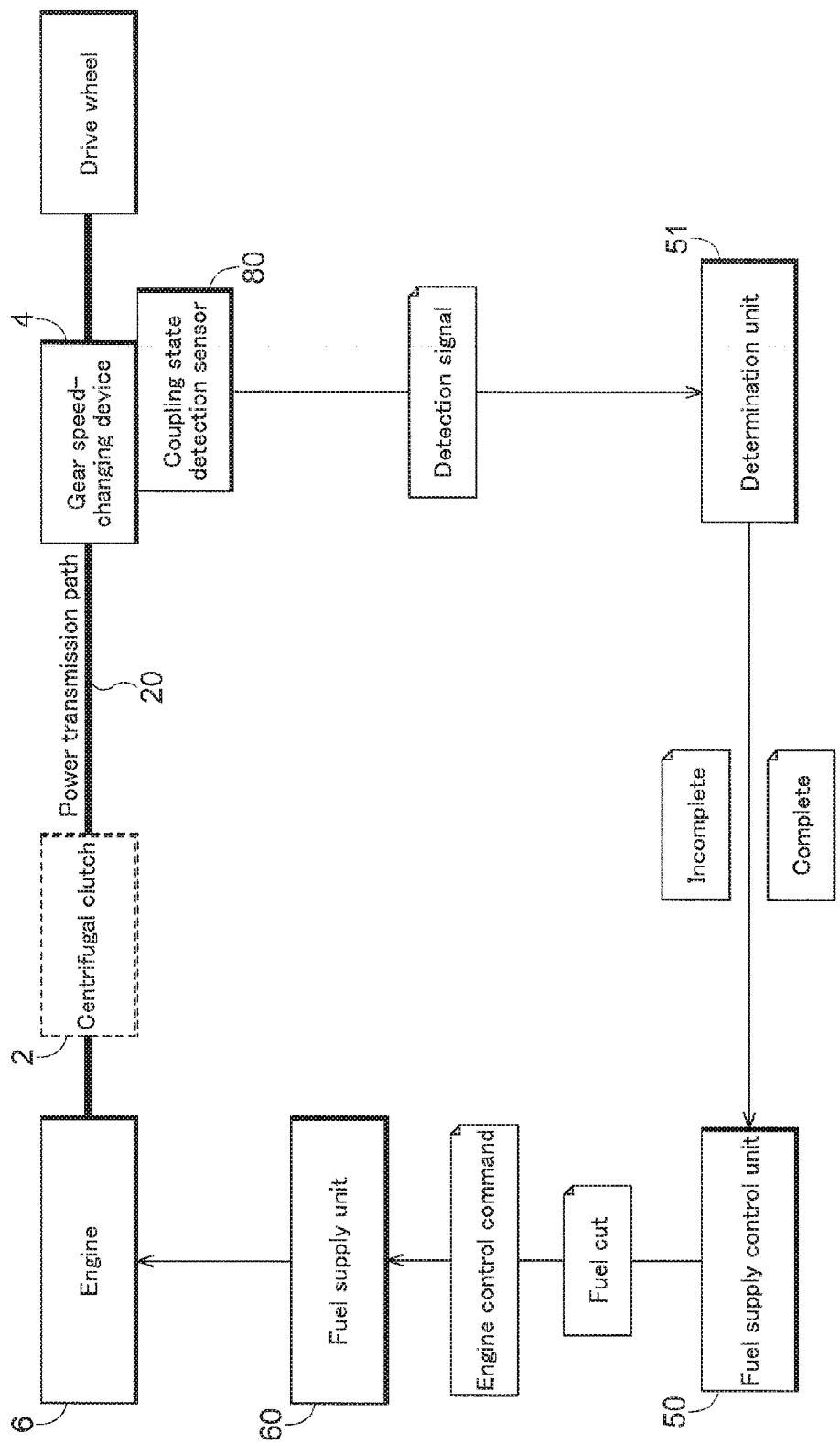
FIG. 1 is a schematic diagram showing a basic principle of fuel cut control according to the present invention.

Prior to describing a specific embodiment of a multipurpose vehicle according to the present invention, a basic principle of fuel cut control according to the present invention will be described with reference to FIG. 1. In the illustrated diagram, speed of power from an engine 6 is changed by a gear transmission device 4 and transmitted to a drive wheel. The gear transmission device 4 has a plurality of gears, and the speed change is realized by switching from one gear to another gear through a shifting operation. The state of coupling of the gears as a result of this shifting operation, that is, the state of meshing of speed-changing meshing members is detected by a coupling state detection sensor 80. The coupling state detection sensor 80 can be constituted by, for example, a position detection sensor that detects the position of a speed-changing meshing member or a speed-changing shifter associated therewith. There is provided a determination unit 51 that determines the coupling state of the gear transmission device 4 based on a detection signal of the coupling state detection sensor 80. The determination unit 51 outputs, as a determination result, a complete coupling state if the gear transmission device 4 is in a completely coupled state (e.g., a state in which the speed-changing meshing member or the speed-changing shifter is in a coupling position), or an incomplete coupling state if the gear transmission device 4 is in a state in which coupling is not completed and power is not transmitted (e.g., a state in which the speed-changing meshing member or the speed-changing shifter is out of the coupling position).

The number of revolutions of the engine 6 is adjusted using a fuel supply amount that is supplied by a fuel supply unit 60. The fuel supply amount to be supplied by the fuel supply unit 60 is determined based on an engine control command that is generated and outputted by a fuel supply control unit 50. The fuel supply control unit 50 generates the engine control command based on data on the engine speed, data on the amount of operation of an accelerator operating tool or the like, and other data. Typically, the fuel supply control unit 50 derives a reference value with respect to the fuel supply amount from the amount of operation of the accelerator operating tool or the like using an arithmetic expression or a look-up table, generates the engine control command from this reference value, and provides the fuel supply unit 60 with the generated engine control command. Furthermore, if the determination unit 51 outputs incomplete coupling state as the determination result, the fuel supply control unit 50 provides the fuel supply unit 60 with a fuel cut command to perform a fuel cut to reduce the fuel supply amount to a value less than the reference amount. It is preferable that the amount of reduction is set such that the engine speed becomes zero or substantially zero.

It should be noted that if a centrifugal clutch 2 is provided on a power transmission path 20 between the engine 6 and the gear transmission device 4 as shown in the dashed line in FIG. 1, it is preferable that the amount of reduction in fuel supply based on the fuel cut command is set such that the number of revolutions of the engine transmitted to the centrifugal clutch becomes smaller than a clutch-in number of revolutions at which the centrifugal clutch 2 is engaged.

With this configuration, when the gear transmission device 4 is in the incomplete coupling state, the number of revolutions inputted to the gear transmission device 4 becomes zero, and therefore the occurrence of gear noise during the speed change is avoided.

When coupling of the gear transmission device 4 is complete, the determination unit 51 outputs complete coupling state, and thus, the fuel supply control unit 50 provides the fuel supply unit 60 an engine control command to perform fuel supply in accordance with the reference.

[Overall Structure of the Multipurpose Vehicle]

Next, a specific embodiment of the multipurpose vehicle according to the present invention will be described.

Figure 2:
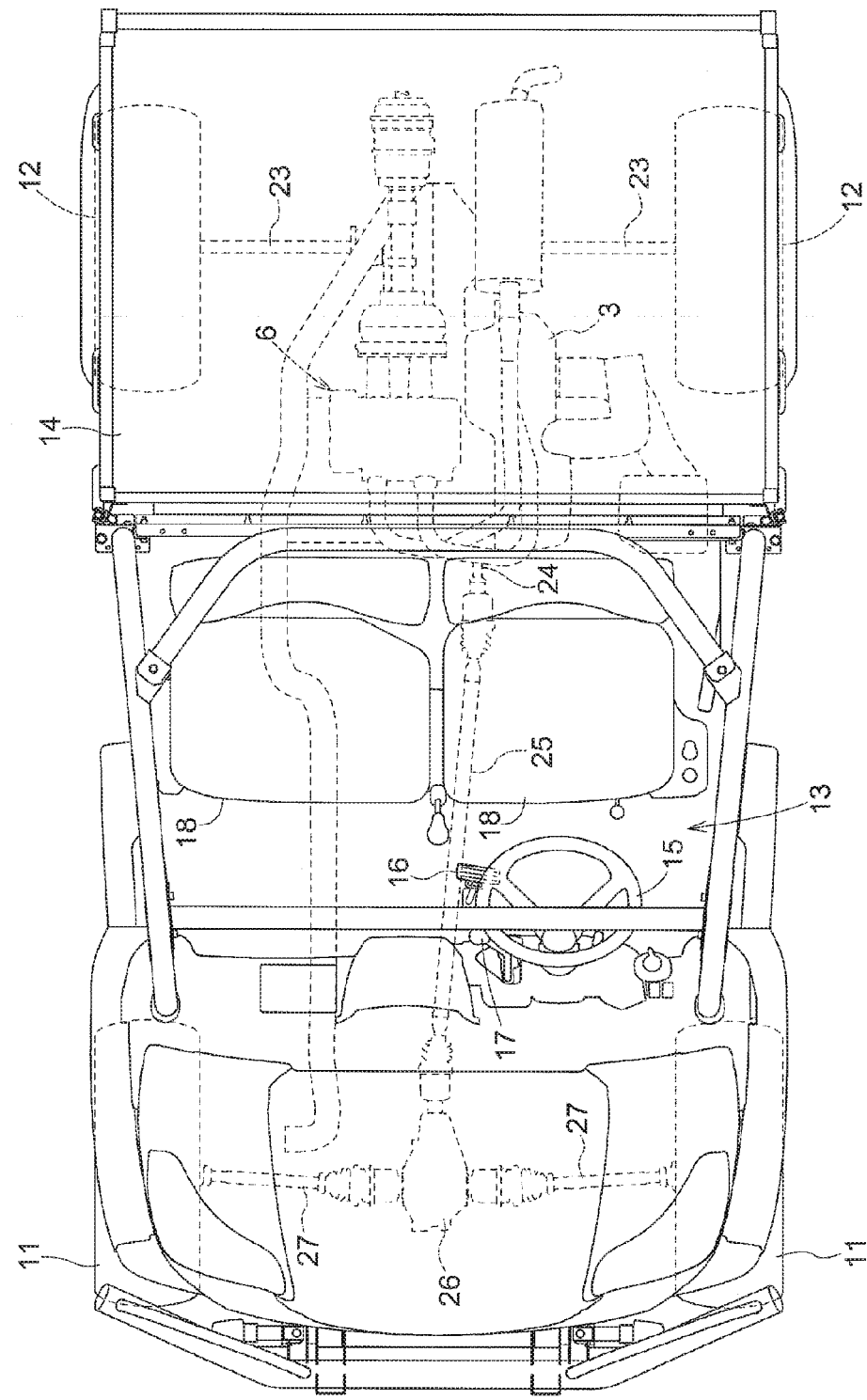
FIG. 2 is a plan view of a multipurpose vehicle.
Figure 3:
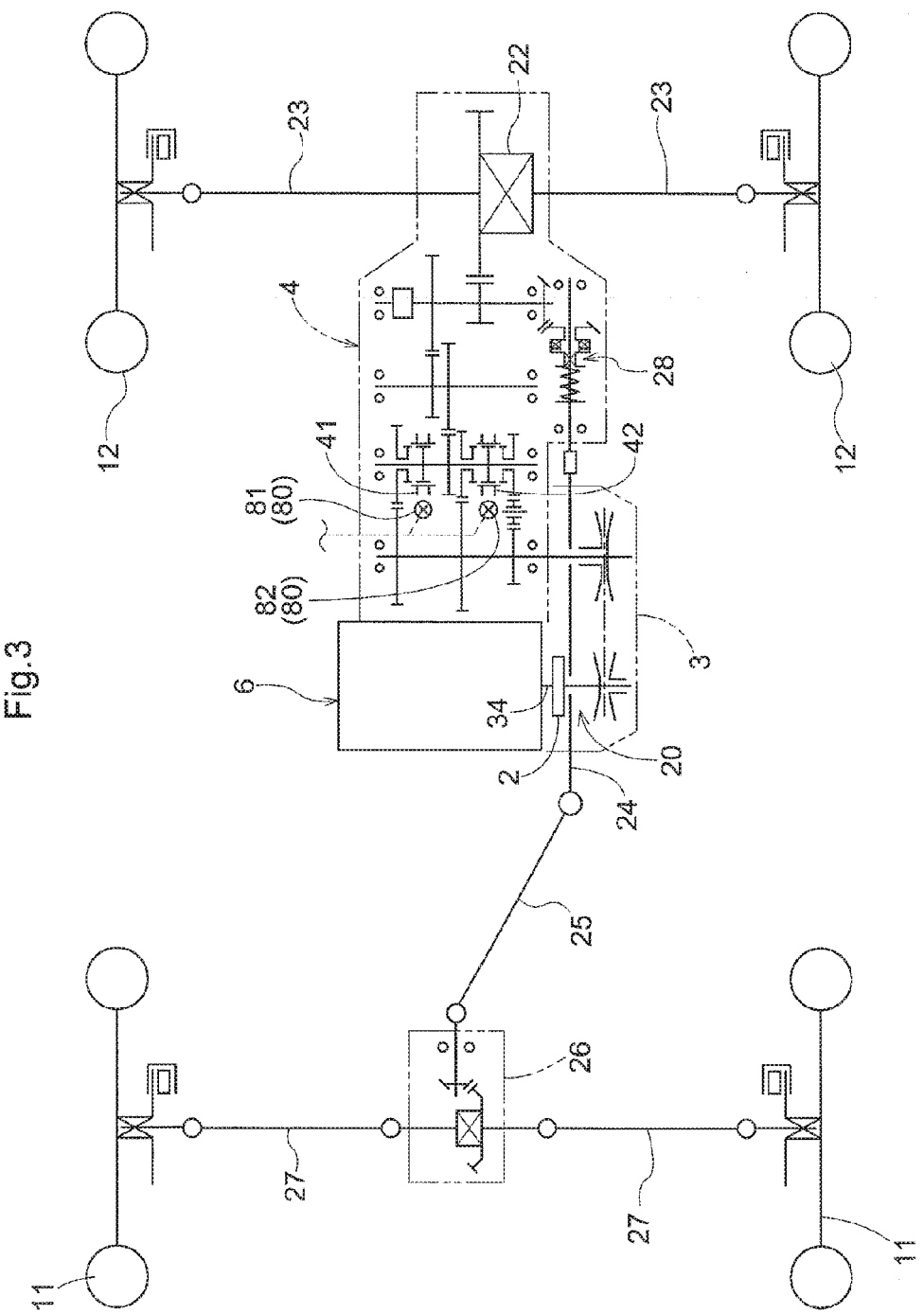
FIG. 3 is a schematic diagram showing a power transmission path of the multipurpose vehicle.

A multipurpose vehicle shown in FIGS. 2 and 3 is configured as a vehicle that can be used for various purposes such as cargo transport or recreation, and such a vehicle is referred to as a utility vehicle also. The multipurpose vehicle includes the engine 6 that is constituted by a water-cooled gasoline engine, and a traveling vehicle body having its drive wheels that are driven based on a driving force of the engine 6. The multipurpose vehicle of this embodiment is a four-wheel drive vehicle, and includes a pair of right and left front wheels 11 that can be driven and that can be steered, and a pair of right and left rear wheels 12 that can be driven, whereby the four wheels 11, 12 function as drive wheels. In a central region of the traveling vehicle body, the multipurpose vehicle includes a driver's section 13 where a driver is seated to perform driving operations. In a rear region of the traveling vehicle body, the multipurpose vehicle includes a cargo bed 14 on which cargo can be carried and from which cargo can be dumped.

In the driver's section 13, a steering wheel 15 for steering the front wheels 11, a man-operated accelerator pedal 16 that is used to change the traveling speed and that serves as an accelerator operating tool, a shift lever 17 that serves as a speed-changing operating tool that is used for shifting gears, seats 18 on which the driver and a passenger can be seated, ets., are provided. The shift lever 17 is configured to be switchable to a first forward gear position, a second forward gear position, a neutral position and a reverse position through a pivoting operation thereof.

As shown in FIG. 3, on the power transmission path 20 through which power from the engine 6 is transmitted, there are provided a belt-type continuously variable (stepless) transmission device 3, the gear transmission device 4 having a high gear, a low gear, and a reverse gear, a rear-wheel differential mechanism 22, a pair of right and left rear axles 23, a power take-off shaft 24, a propeller shaft 25, a front-wheel differential mechanism 26, a pair of right and left front axles 27, and the like. The rear-wheel differential mechanism 22 adjusts the rotational speeds of the right and left rear axles 23 when the traveling vehicle body makes a turn. The front-wheel differential mechanism 26 adjusts the rotational speeds of the right and left front axles 27 when the traveling vehicle body makes a turn.

As shown in FIG. 3, the centrifugal clutch 2 is provided between the engine 6 and the belt-type continuously variable transmission device 3 on the power transmission path 20. In this embodiment, the centrifugal clutch 2 is provided on an output shaft 34 of the engine 6, which also serves as an input shaft of the belt-type continuously variable transmission device 3. Thus, when the number of revolutions (the number of revolutions as used herein means the number of revolutions per unit of time, that is, the rotational speed of the engine 6) of the output shaft 34 of the engine 6 is less than the clutch-in number of revolutions, the centrifugal clutch 2 is disengaged, and thus the power is not transmitted to the belt-type continuously variable transmission device 3 and the gear transmission device 4. On the other hand, when the number of revolutions of the output shaft 34 of the engine 6 reaches or exceeds the clutch-in number of revolutions, the centrifugal clutch 2 is engaged, and the power is transmitted to the belt-type continuously variable transmission device 3 and the gear transmission device 4.

As shown in FIG. 3, the output of the belt-type continuously variable transmission device 3 is transmitted to the gear transmission device 4. The gear transmission device 4 changes speed of power from the belt-type continuously variable transmission device 3 and supplies the power to the drive wheels (front wheels 11 and rear wheels 12).

The gear transmission device 4 shown in FIG. 3 is switchable to the following gear shift states: a first forward gear state, a second forward gear state, a neutral state and a reverse state. Different gear ratios are set for the first forward gear state, the second forward gear state and the reverse state.

When the shift lever 17 is pivoted into the first forward gear position, the gear transmission device 4 is shifted to the first forward gear. When the shift lever 17 is pivoted into the second forward gear position, the gear transmission device 4 is shifted to the second forward gear. When the shift lever 17 is pivoted into the neutral position, the gear transmission device 4 is switched to the neutral state. When the shift lever is pivoted into the reverse position, the gear transmission device 4 is shifted to the reverse gear. In this embodiment, the gear transmission device 4 includes a first shifter 41 and a second shifter 42 that achieve shifting into the above-described gears by performing a shifting operation based on the operating displacement of the shift lever 17. In this embodiment, the gear transmission device 4 further includes a first shifter position detection sensor 81 that detects the position of the first shifter 41, and a second shifter position detection sensor 82 that detects the position of the second shifter 42, each of the shifters 41, 42 serving as a coupling state detection sensor 80 that detects the coupling state of the first shifter 41 or the second shifter 42.

As shown in FIG. 3, the output from the gear transmission device 4 is transmitted to the right and left rear axles 23 via the rear-wheel differential mechanism 22, and thus, the right and left rear wheels 12 are rotated. Moreover, the driving force that has been outputted from the gear transmission device 4 is transmitted to the right and left front axles 27 via the power take-off shaft 24, the propeller shaft 25 and the front-wheel differential mechanism 26, and thus, the right and left front wheels 11 are rotated. The power take-off shaft 24 and the propeller shaft 25 are interlocked with each other by a universal joint, and the propeller shaft 25 and the front-wheel differential mechanism 26 are interlocked with each other by a universal joint. A clutch device 28 is provided on the power take-off shaft 24. When the clutch device 28 is engaged, a portion of the power take-off shaft 24 that is located on an upstream side of power transmission and a portion of the power take-off shaft 24 that is located on a downstream side of power transmission are interlocked with each other, and thus, the power is transmitted to the front wheels 11 side (four-wheel drive state). On the other hand, when the clutch device 28 is disengaged, the interlocking between the portions of the power take-off shaft 24 that are respectively located on the upstream side and the downstream side of power transmission is released, and thus, the power is not transmitted from the power take-off shaft 24 to the front wheels 11 side (two-wheel drive state).

[Fuel Cut Control]

Figure 4:
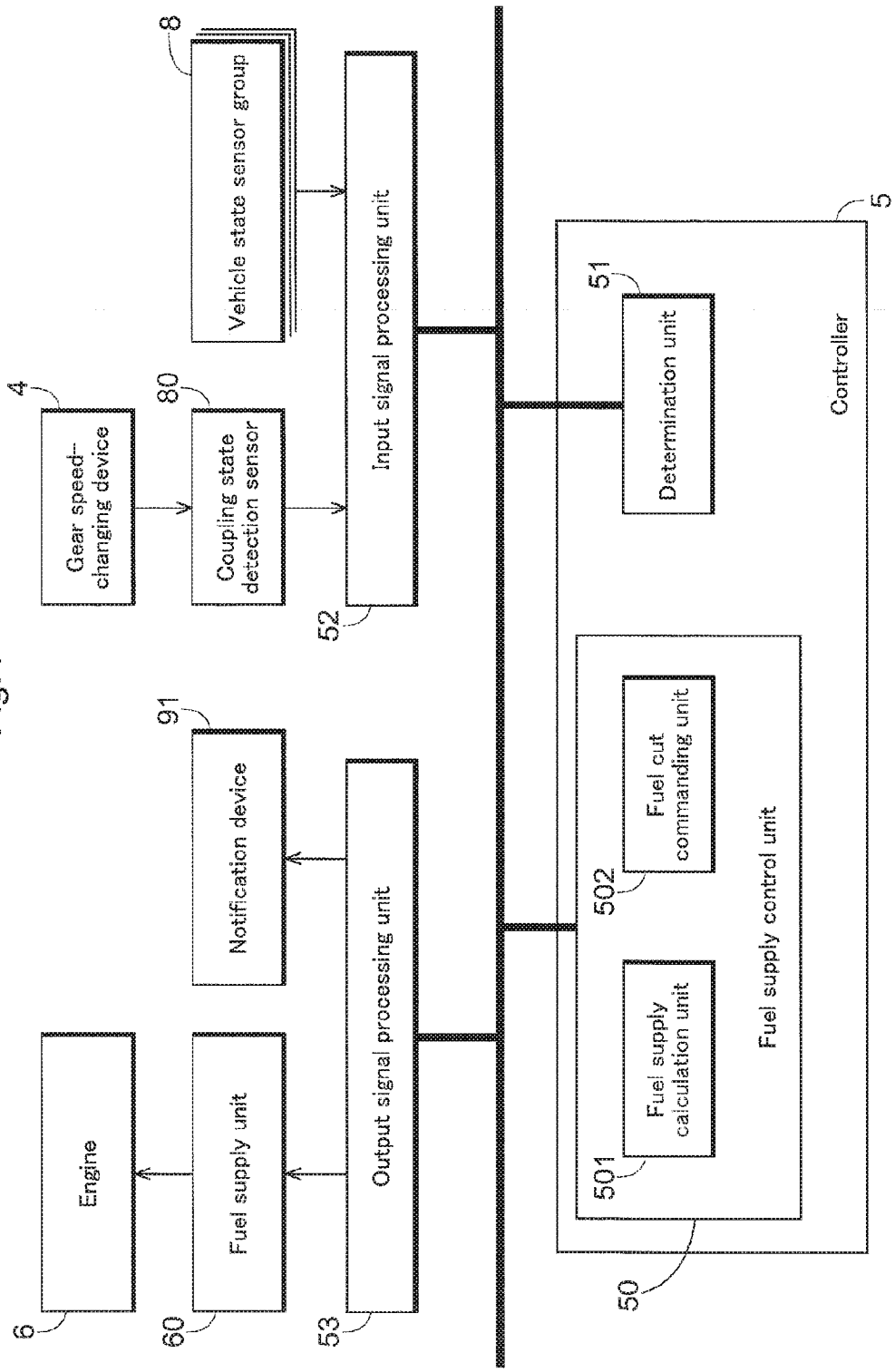
FIG. 4 is a functional block diagram for fuel cut control.
Figure 5:
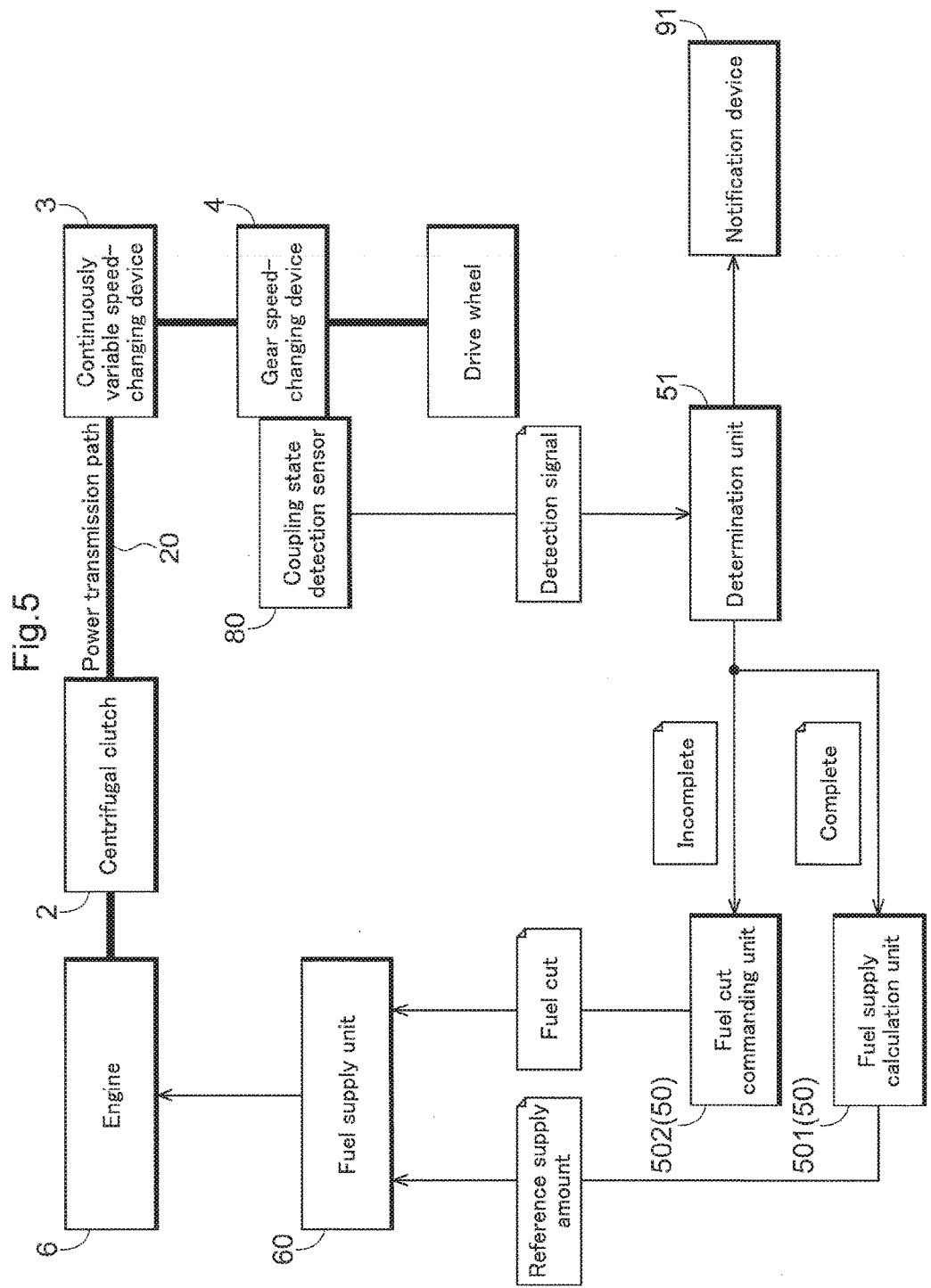
FIG. 5 is a schematic diagram showing a data flow in fuel cut control.

FIG. 4 shows a functional block diagram of a fuel supply control system of a controller 5 of this multipurpose vehicle. FIG. 5 is a schematic diagram showing a data flow in fuel cut control.

The controller 5 includes the fuel supply control unit 50, the determination unit 51, an input signal processing unit 52 and an output signal processing unit 53. The input signal processing unit 52 receives detection signals from the coupling state detection sensors 80 that detect the coupling state of the gear transmission device 4, and detection signals from a vehicle state detection sensor group 8 constituted by, for example, sensors that detect the operating displacement of the accelerator pedal 16, a brake pedal, and the like. The input signal processing unit 52 performs necessary pre-processing of the received detection signals, and then transfers these detection signals to the functional units of the controller 5. The output signal processing unit 53 is connected to the fuel supply unit 60 that supplies fuel to the engine 6, and a notification device 91. The output signal processing unit 53 sends the fuel supply unit 60 a control command regarding the supply of fuel that is generated by the fuel supply control unit 50; and sends the notification device 91 an appropriate notification signal in order to visually or audibly notify the driver of information that should be notified to the driver.

The fuel supply control unit 50 includes a fuel supply amount calculation unit 501 and a fuel cut commanding unit 502. The determination unit 51 and the fuel cut commanding unit 502 operate substantially based on the basic principle that has been described with reference to FIG. 1. The determination unit 51 determines, based on the detection signals from the coupling state detection sensors 80, whether the gear transmission device 4 is in the incomplete coupling state (the state in which shift gears are not yet meshed) or the complete coupling state, and provides the determination result to the fuel supply control unit 50. At the same time, in order to notify the driver of the determination result, the determination unit 51 provides a notification signal to the notification device 91 via the output signal processing unit 53 in order to cause the notification device 91 to operate such that the driver can determine whether the gear transmission device 4 is in the incomplete coupling state or the complete coupling state.

Based on the amount of operation of the accelerator operating tool such as the accelerator pedal 16, the fuel supply amount calculation unit 501 calculates the fuel supply amount to be supplied to the engine 6 (reference supply amount). If the determination unit 51 determined that the coupling state is the complete coupling state (state in which power is transmitted via the gear transmission device 4), the fuel supply control unit 50 provides the fuel supply unit 60 with a fuel supply command corresponding to the fuel supply amount that is calculated by the fuel supply amount calculation unit 501.

If the determination unit 51 determines that the coupling state is the incomplete coupling state, on the other hand, the fuel cut commanding unit 502 provides the fuel supply unit 60 with a fuel cut command to execute a fuel cut to reduce the fuel supply amount to a value smaller than the reference value that is calculated by the fuel supply amount calculation unit 501. The amount of reduction in fuel by the fuel cut is adjustable, and the fuel supply amount can be reduced even to zero. In this embodiment, the fuel supply amount of the fuel supply to be executed in accordance with the fuel cut command is set such that the number of revolutions of the engine that is inputted to the centrifugal clutch 2 becomes smaller than the clutch-in number of revolutions at which the centrifugal clutch 2 is engaged. Therefore, when the gear transmission device 4 is in the incomplete coupling state, the engine speed is not increased even if the accelerator pedal 16 is depressed, and power transmission from the centrifugal clutch 2 to the gear transmission device 4 is blocked.

[Flow of Fuel Cut Control]

Next, an example of the flow of fuel cut control will be described with reference to FIGS. 5 and 6. In a fuel cut control routine in FIG. 6, if the engine 6 is in a fuel-cut state, "1" is stored in a cut flag. If the engine 6 receives the reference supply amount of fuel, "0" is stored in the cut flag. In initial processing of the control, the cut flag is set to "0".

Figure 6:
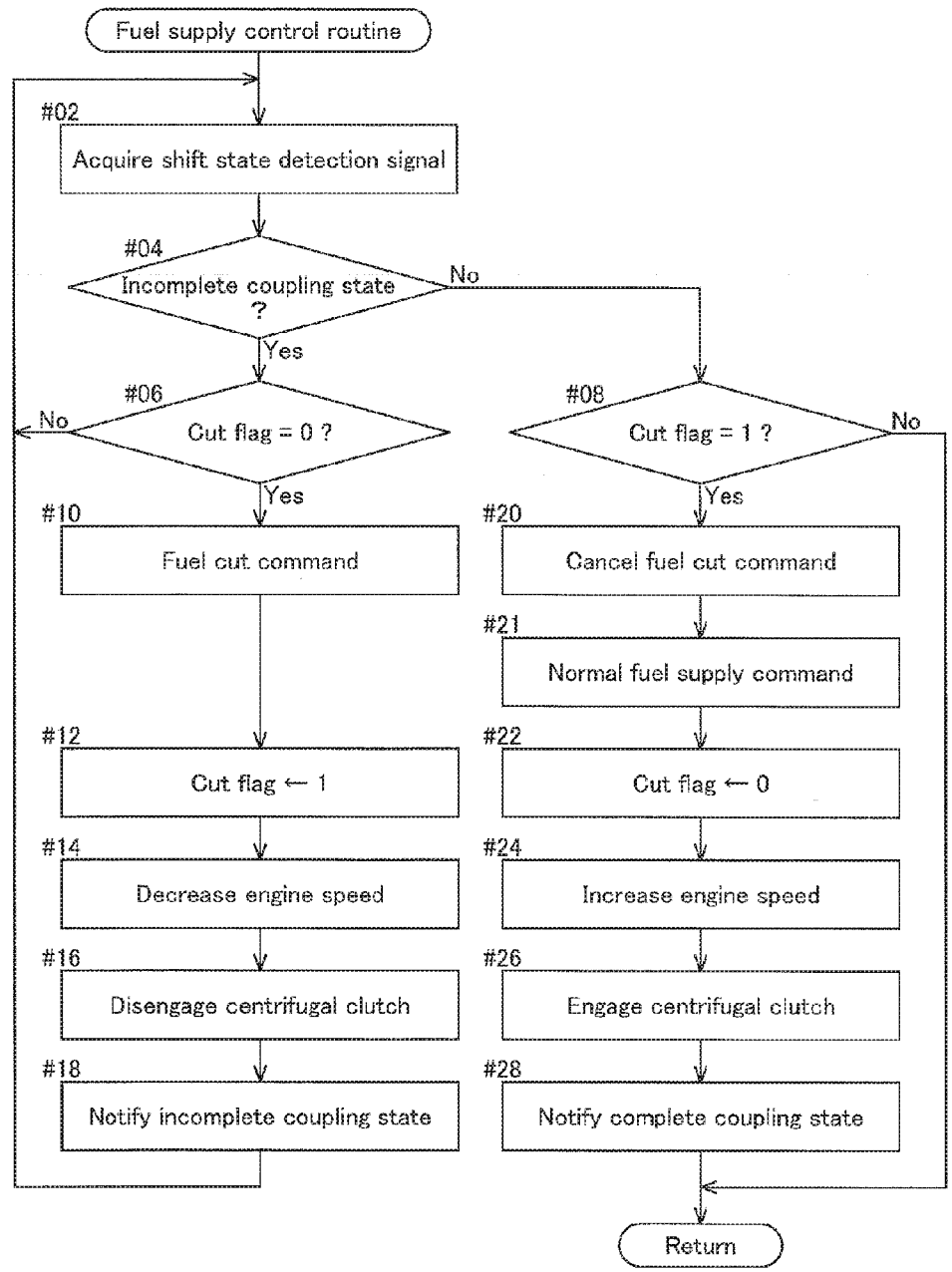
FIG. 6 is a flowchart illustrating an example of fuel cut control.

When the processing enters the fuel cut control routine as shown in FIG. 6, the determination unit 51 first acquires shift state detection signal from the coupling state detection sensors 80 (Step #02). Based on the detection signals, the determination unit 51 determines whether the coupling state (meshing state) of the gear transmission device 4 is complete (completely in gear mesh) or incomplete (out of gear mesh). If the determination unit 51 determines that the gear transmission device 4 is in the incomplete coupling state (Step #04), then, the determination unit 51 checks whether or not the value of the cut flag is "0" or not (Step #06). If the value of the cut flag is "0", the determination unit 51 regards that the gear transmission device 4 has just transitioned from the complete coupling state to the incomplete coupling state. Accordingly (the processing branches to Yes at Step #06), fuel cut processing is started. First, the fuel cut commanding unit 502 sends a fuel cut command to the fuel supply unit 60 (Step #10). This switches the engine 6 to the fuel-cut state, and thus, "1" is stored in the cut flag to indicate that the fuel cut processing is underway (Step #12). As a result of the fuel cut, the engine speed decreases (Step #14), and the number of revolutions inputted to the centrifugal clutch 2 becomes smaller than the clutch-in number of revolutions at which the centrifugal clutch 2 is engaged. Thus, power transmission by the centrifugal clutch 2 is blocked (Step #16). Furthermore, the notification device 91 receives a control signal for notifying the driver of the situation in which the coupling state of the gear transmission device 4 is incomplete, that is, the gears are not properly meshed (Step #18).

If the value of the cut flag is "1" as the result of checking at Step #06 (the processing branches to No at Step #06), it is determined that the coupling state remains incomplete and the fuel cut processing remains underway. Then, the routine returns to Step #02 to acquire another shift state detection signal.

If the determination unit 51 determines that the gear transmission device 4 is in the complete coupling state, the routine branches to No at Step #04 as a result of checking, and then the value of the cut flag is checked (Step #08). If the value of the cut flag is "1" (the processing branches to Yes at Step #08), it is regarded that the coupling state of the gear transmission device 4 has transitioned from the incomplete coupling state to the complete coupling state. Therefore, the fuel cut command is canceled (Step #20), and a normal engine control command containing the reference fuel supply amount calculated by the fuel supply amount calculation unit 501 (reference supply amount) is sent to the fuel supply unit 60 (Step #21). This switches the engine 6 to a normal fuel supply state in which the reference fuel supply amount is supplied thereto, and thus "0" is stored in the cut flag (Step #22). As a result of the normal fuel supply, the engine speed increases (Step #24), and the number of revolutions inputted to the centrifugal clutch 2 becomes greater than the clutch-in number of revolutions for engaging the centrifugal clutch 2. Accordingly, the centrifugal clutch 2 is engaged, and power transmission by the centrifugal clutch 2 is performed (Step #26). Furthermore, the notification device 91 receives a control signal for notifying the driver of the complete coupling state of the gear transmission device 4 to indicate that the gears are properly meshed (Step #28).

If the value of the cut flag is "0" as the result of checking at Step #08 (the processing branches to No at Step #08), this means that the gear transmission device 4 is in the complete coupling state. Therefore, the processing temporarily exits the present routine until the processing enters the routine again at a predetermined timing later. Of course, the processing may remain on the loop instead, to repeat the illustrated routine until a key switch of the vehicle is turned off.

Other Embodiments (1) In the foregoing embodiment, the centrifugal clutch 2 and the belt-type continuously variable transmission device 3 are disposed on the power transmission path 20 between the engine 6 and the gear transmission device 4. However, these elements are not essential. When the centrifugal clutch 2 is not present, for example, the number of revolutions of the engine 6 can be reduced to zero by reducing the fuel supply to zero through the fuel cut.

(2) In the foregoing embodiment, the gear transmission device 4 is illustrated as including the first forward gear, the second forward gear and the reverse gear. However, such a gear arrangement is not limitative. Instead thereof, the gear transmission device 4 may have other gear(s) in addition to the first forward gear, the second forward gear and the reverse gear such that the gear transmission device 4 includes three or more forward gears with different gear ratios, for example. Alternatively thereto, the gear transmission device 4 may have one and only forward gear.

(3) In the foregoing embodiment, the coupling state detection sensors 80 are constituted by the position detection sensors that detect the positions of the speed-changing meshing members and the speed-changing shifters. Instead thereof, there may be provided an operating displacement coupling link system that couples the shift lever 17 and the gear transmission device 4 to each other, in which system a sensor may be used for detecting an amount of displacement of a displacement member that is displaced in accordance with the transition of the gear transmission device 4 between the complete coupling state and the incomplete coupling state.

(4) In the foregoing embodiment, the continuously variable transmission device is exemplified by the belt-type continuously variable transmission device 3 that changes the output rotational speed in a continuously variable manner depending on the input rotational speed, but this is not limitative. Instead thereof, the continuously variable transmission device may be a hydrostatic transmission device (an HST), for example.

What is claimed is:

1. A multipurpose vehicle comprising:
   an engine;
   a fuel supply unit that supplies fuel to the engine;
   a gear transmission device that changes speed of power from the engine through a shifting operation;
   a coupling state detection sensor that detects a coupling state of the gear transmission device;

a determination unit configured to determine when the coupling state is an incomplete coupling state based on a detection signal from the coupling state detection sensor; and a fuel supply control unit that executes a fuel cut to reduce a supply amount of the fuel from the fuel supply unit to the engine to a value less than a reference value based on receiving an indication from the determination unit that the coupling state is the incomplete coupling state.

2. The multipurpose vehicle according to claim 1, further comprising a centrifugal clutch that is provided on a power transmission path between the engine and the gear transmission device, an amount of reduction in the fuel by the fuel cut being set such that a number of revolutions of the engine becomes smaller than a clutch-in number of revolutions at which the centrifugal clutch is engaged.

3. The multipurpose vehicle according to claim 2, further comprising a continuously variable transmission device that is provided on the power transmission path between the centrifugal clutch and the gear transmission device.

4. The multipurpose vehicle according to claim 1, further comprising:

a man-operated tool for performing the shifting operation of the gear transmission device; and a notification device that provides a driver who performs the shifting operation with a notification that the coupling state is the incomplete coupling state.

* * * * *